(12) United States Patent
Jones

(10) Patent No.: US 7,850,248 B2
(45) Date of Patent: Dec. 14, 2010

(54) HYDRAULIC SYSTEM

(75) Inventor: Eldon D. Jones, Lake Crystal, MN (US)

(73) Assignee: Jones Building LLLP, Lake Crystal, MN (US)

( * ) Notice: Subject to any disclaimer, the term of this patent is extended or adjusted under 35 U.S.C. 154(b) by 391 days.

(21) Appl. No.: 12/070,357

(22) Filed: Feb. 15, 2008

(65) Prior Publication Data

US 2009/0206648 A1     Aug. 20, 2009

(51) Int. Cl.
*B60P 1/16*     (2006.01)
(52) U.S. Cl. .................................. 298/22 R
(58) Field of Classification Search .............. 298/22 R, 298/22 C; 137/596, 565.01; 60/403; 239/657
See application file for complete search history.

(56) References Cited

U.S. PATENT DOCUMENTS

| | | | |
|---|---|---|---|
| 1,734,320 A * | 11/1929 | Williams | 298/17.8 |
| 1,983,280 A * | 12/1934 | Flowers | 298/17.7 |
| 2,097,555 A * | 11/1937 | Anthony | 298/22 D |
| 2,144,599 A | 3/1938 | Anthony | |
| 2,146,166 A * | 2/1939 | Anthony et al. | 60/472 |
| 2,358,224 A | 4/1942 | Golay | |
| 2,488,790 A | 3/1947 | Wood | |
| 2,603,518 A | 2/1948 | Golay | |
| 2,509,911 A | 12/1948 | Dore | |
| 2,480,528 A * | 8/1949 | Wachter | 414/546 |
| 2,611,642 A | 10/1949 | Gwinn | |
| 2,654,491 A * | 10/1953 | Duis et al. | 414/557 |
| 2,684,864 A * | 7/1954 | Anthony | 298/22 P |
| 2,836,460 A | 10/1955 | Lundell | |
| 3,034,831 A * | 5/1962 | Biszantz et al. | 298/22 D |
| 3,039,823 A * | 6/1962 | Eaton | 298/22 R |
| 3,211,428 A | 10/1965 | Spracklin | |
| RE26,455 E | 9/1968 | Jones | |
| 3,594,042 A | 7/1971 | Gauch | |
| 3,791,695 A | 2/1974 | Seniuk | |
| 4,029,358 A | 6/1977 | Bergdolt | |
| 4,052,105 A | 10/1977 | Moe | |
| 4,109,963 A * | 8/1978 | Sieving et al. | 298/23 M |
| 4,138,158 A * | 2/1979 | Jones | 298/17 B |
| 4,176,881 A | 12/1979 | Cole | |
| 4,182,534 A * | 1/1980 | Snyder | 298/22 C |
| 4,302,050 A | 11/1981 | Jones | |
| 4,741,576 A | 5/1988 | Jones | |
| 4,762,370 A | 8/1988 | Corompt et al. | |
| 4,898,333 A * | 2/1990 | Kime et al. | 239/657 |

(Continued)

FOREIGN PATENT DOCUMENTS

CA     722518     11/1965

(Continued)

OTHER PUBLICATIONS

The American Wet Tank Systems advertisement and Williams Machine Tool advertisement, Trailer Body Builders, Jul. 1999, p. 245 and 410.

*Primary Examiner*—Hilary Gutman
(74) *Attorney, Agent, or Firm*—Matthew A. Pequignot; Pequignot + Myers LLC

(57) ABSTRACT

A hydraulic system useful in combination with a hoist for raising or lowering a truck bed to and from a truck frame, including safely and controllably lowering said truck bed to said truck frame by gravity alone, is provided.

19 Claims, 11 Drawing Sheets

U.S. PATENT DOCUMENTS

| | | |
|---|---|---|
| 4,938,454 A | 7/1990 | Jones |
| 5,040,849 A | 8/1991 | Thomas et al. |
| 5,048,896 A | 9/1991 | Channell |
| RE33,835 E * | 3/1992 | Kime et al. ................. 239/657 |
| 5,195,385 A | 3/1993 | Johnson |
| 6,186,596 B1 | 2/2001 | Jones |
| 6,543,856 B2 | 4/2003 | Jones |
| 6,561,589 B2 | 5/2003 | Jones |

FOREIGN PATENT DOCUMENTS

| | | |
|---|---|---|
| GB | 2049566 | 12/1980 |

* cited by examiner

A

B

C

Air Controls

A   Relief valve 50 and/or 12

B   Check valve 49 and/or 11

HYDRAULIC SYSTEM

FIELD OF THE INVENTION

This invention relates to hydraulic systems used, for example, in connection with hydraulic hoists, such as on trucks, including dump trucks. In particular, the invention is useful for hoists having double acting hydraulic cylinders which provide hydraulic power to both raise ("power up") and lower ("power down"), for example, a truck dump body.

BACKGROUND OF THE INVENTION

Hoists come in different kinds, including front mount, single acting telescopic hoists and underbody frame type hoists using double acting cylinders. Differences exist between these two types of hoists. While front mount telescopic hoists require substantial amounts of hydraulic fluid for operation, which in turn requires large and heavy reservoirs filled with expensive hydraulic fluid, which must be pumped by large and heavy, high volume pumps, by contrast, underbody hoists typically require only a third as much hydraulic fluid, or even less, and much smaller pumps and reservoirs. Underbody hoists using double acting cylinders also offer a number of options that operators may be unaware of, or choose not to use.

For example, hydraulic hoists using double acting cylinders are common in the trucking industry, but are often misused by using hydraulic power only to raise, but not lower, a dump body. This misuse occurs when the operator disengages the hydraulic power unit after raising the dump body and dumping a load, and thereby lowers the dump body by gravity alone to its original position. This action often results in air entering the hydraulic system, the presence of which may decrease the operator's control of the dump body, which could become erratic and possibly dangerous. Similarly, when the cylinder of the hydraulic hoist does not "lock down" the dump body, it is free to rattle and bounce during transit.

In view of the above, it is apparent that there exists a need in the art for a hydraulic system, for truck hoists or other uses, which addresses, overcomes, mitigates, or solves one or more of the above problems and/or drawbacks and/or inefficiencies in the art. It is the purpose of this invention to fulfill this and/or other needs in the art which will become apparent to the skilled artisan once given the following disclosure.

SUMMARY OF THE INVENTION

Generally speaking, this invention addresses the above-described needs in the art by providing a more efficient, safer and economical hydraulic system, preferably for use with double acting hydraulic cylinders. The invention includes among its features and advantages providing the operator of a hydraulic hoist with the option of safely and controllably lowering a truck bed, preferably a dump body, either empty or full, to a truck frame by gravity alone.

In one aspect, the invention provides an improved hydraulic system over those previously used in the art. In one embodiment, the invention provides a substantially sealed hydraulic system that avoids the above-described problems resulting from operator misuse by allowing the operator to lower a dump body either by using hydraulic power (i.e., "powering down") or by gravity alone, without air entering the system.

In another aspect, the invention provides methods for achieving the above features and results. In still other aspects, the invention provides various novel components that enable a hydraulic system to operate in accordance with the invention.

In one embodiment, a hydraulic system is provided, which is useful in combination with a hoist for raising or lowering a truck bed to and from a truck frame, and includes the option of safely and controllably lowering the truck bed to the truck frame by gravity alone. The hydraulic system comprises, in operative combination, a cylinder, a reservoir, a system control means, and a pump.

The cylinder is preferably an extendible and retractable cylinder for raising or lowering the truck bed, and comprises a cylinder shaft having a first end and a second end. The first end of the cylinder shaft comprises a piston, or some equivalent thereof, which preferably moves with the cylinder shaft inside the cylinder housing as the cylinder is extended and retracted. The piston preferably comprises a valve means for regulating the flow of hydraulic fluid through the piston. The cylinder housing comprises a base end and a head end, wherein the base end comprises a base port for allowing the hydraulic fluid to flow into and out the base end of the cylinder housing. The base port preferably comprises a valve means for regulating the flow of hydraulic fluid through the base port. In one embodiment, the valve means is capable of substantially restricting, and thereby pressurizing, the flow of the hydraulic fluid from the cylinder housing while lowering the truck bed by gravity alone. In another embodiment, the valve means in the base port, and/or optionally as a coupling device, is capable of blocking the flow of hydraulic fluid from the cylinder housing while attempting to lower the truck bed by gravity alone. The head end of the cylinder housing comprises a head port, which allows the hydraulic fluid to flow into and out of the head end of the cylinder housing.

The reservoir in part stores the hydraulic fluid, and can be fluidly connected directly to the head end of the cylinder housing. The inside of the reservoir during operation of the system contains a combination of hydraulic fluid and air, which renders the inside of the reservoir capable of being pressurized while lowering the truck bed. The reservoir also comprises a first port and also preferably a second port through which the hydraulic fluid can flow during operation of the system. The second port preferably comprises a valve means that permits the hydraulic fluid to leave, but not enter, the reservoir. One or more reservoir air control valves also preferably are associated with the reservoir and are useful for regulating pressure inside the reservoir. The reservoir further preferably comprises a third port through which hydraulic fluid can be added to the reservoir, typically prior to the operation of the system. The third port also preferably contains during operation of the system a means for sealing, or substantially sealing, the third port from air entering or leaving the reservoir. The sealing means preferably is a plug, or some equivalent, which is preferably removable.

The system control valve means can be fluidly connected to the reservoir, as well as preferably to both the head end and the base end of the cylinder housing for regulating the flow of hydraulic fluid between the reservoir and the cylinder housing.

The pump or pump means can be fluidly connected preferably to both the system control valve means and the reservoir, and can be used for pumping the hydraulic fluid through the system, for purposes including to power up and power down a hoist associated with the cylinder.

During operation of the system, the reservoir, when pressurized while lowering the truck bed, causes the hydraulic fluid to flow from the reservoir preferably through the second port and into the head end of the cylinder housing. One advantage of the present invention thus is that the combination of the pressurized reservoir and the hydraulic fluid present in the head end of the cylinder housing permits the option of the truck bed being safely and controllably lowered by gravity alone to the truck frame. In the above system embodiment, while lowering the truck body by gravity alone, movement of the piston inside the cylinder housing and towards the base end thereof will create suction, causing oil to flow directly from the reservoir and into the head end of the cylinder housing, which thereby causes the flow of hydraulic fluid from the reservoir into the cylinder housing, even without the pump operating. This fluid flow contributes to the truck bed being able to be safely and controllably lowered by gravity alone to the truck frame.

In one embodiment of the second aspect of the invention, a method is provided for safely and controllably lowering a truck bed, preferably a dump body, by gravity alone after raising the truck bed. The preferred dump body can be empty or full, or in between. Once providing a truck with the above hydraulic system, the method comprises the steps of raising the preferred dump body with the pump engaged, followed by lowering the dump body, for example, with the pump disengaged, by gravity alone.

In both of the above aspects of the invention, the cylinder is preferably a double acting cylinder. The components preferably are operatively or fluidly connected by hosing. A preferred reservoir preferably holds no more than about three to about five gallons of hydraulic fluid, and preferably is shaped in part like a pair of steps comprising a lower step and an upper step, wherein each of the steps comprises a front portion and a top portion. The top step of the preferred reservoir comprises an air chamber, while the third port of the reservoir, through which fluid is added to the system, is located on the top of the lower step of the reservoir.

Certain examples of the invention are described below with respect to certain non-limiting embodiments thereof as illustrated in the following drawings wherein:

BRIEF DESCRIPTION OF THE DRAWINGS

FIG. 4A is a plan view, FIG. 4B is a side view, and FIG. 4C is an end view of the embodiment.

DETAILED DESCRIPTION OF CERTAIN EMBODIMENTS

In connection with the present invention, the following terms are defined as follows:

To lower a truck bed "by gravity alone" means lowering the truck bed without a power source (i.e., "powering down") being required. For example, it is envisioned that the cylinder retracts to lower the truck bed due to the weight of the truck bed or preferred dump body. Nevertheless, in order to "speed up" the truck bed lowering process, the scope of the invention does not preclude the use of a "power assist."

The term "fluidly connected" means that the following components: the pump A, the system control valve B, the cylinder C, and the reservoir D, are connected to each other, preferably by hosing and/or other connection devices, or their equivalents, which are typically used in hydraulic systems, such that hydraulic fluid (or some other suitable fluid or gas) is capable of flowing, preferably directly, from one to another of the above components.

The term "valve means" used to describe different components of the subject hydraulic system that regulate the flow of hydraulic fluid from one location to another includes structures such as valves and other structures that perform the same function as valves generally. Further, that the valve means in the base port of the cylinder housing is "capable of substantially restricting" the flow of hydraulic fluid out of the base end of the cylinder housing means that the valve means impedes the flow of the hydraulic fluid by an amount at least sufficient to pressurize the hydraulic fluid, while also allowing time for hydraulic fluid to flow from the reservoir and into the head end of the cylinder housing.

For a complete understanding of the present invention and advantages thereof, reference is made to the following description of various illustrative and non-limiting embodiments thereof, taken in conjunction with the accompanying drawings in which like reference numbers indicate like features.

Figure 1A:
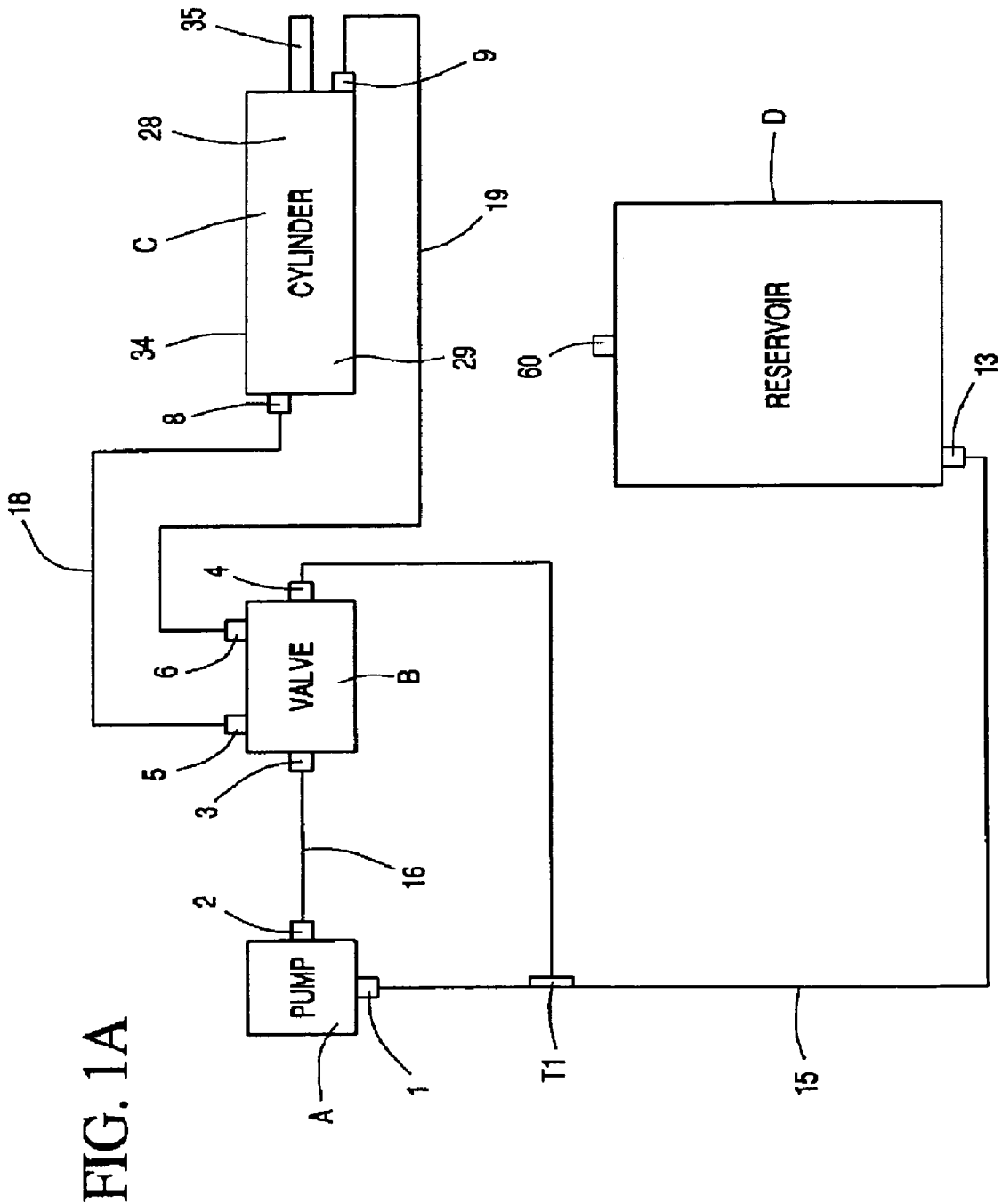
FIG. 1A is a schematic diagram of a conventional hydraulic system.

FIG. 1A is a schematic of an embodiment of a conventional hydraulic system, which is common in the industry to operate truck hoists with double acting cylinders. The solid lines (15-19) connecting pump A, system control valve B, cylinder C, and reservoir D optionally represent various hoses or other connection devices of proper sizing and characteristics for transporting hydraulic fluid between the various system components, as shown. The reservoir in the conventional system is typically quite large, with a capacity of from about ten to as many as forty gallons. Reservoirs used in the conventional systems also typically include a breather vent 60 that allows air to flow freely into and out of the reservoir.

In FIG. 1A, hydraulic pump A can be a standard hydraulic pump, the size of which can vary depending on the particular application. Pump A has an inlet port 1, to which one end of a suction hose 15 is connected, while the other end of hose 15 is connected to a suction port 13 of reservoir D. Pump pressure port 2 is connected by hose 16 to inlet port 3 of system control valve B, which preferably is double acting. Port 4 of control valve B is a return port connected by hose 17 to a Tee T1 in suction hose 15 between pump A and reservoir D. Port 4 alternatively can be connected directly to reservoir D. When pump A is operating and control valve B is in the neutral position, hydraulic fluid (e.g., oil) can circulate through the system by flowing into control valve B at port 3 and out port 4 to reservoir D.

Referring to FIG. 1A, when control valve B is adjusted to raise the hoist, oil flows from pump A through control valve B, out port 5, and through hose 18 to base port 8 of the cylinder housing 34. As oil flows under pressure and unrestricted through base port 8 into the base end 29 of the cylinder housing 34, oil present in the head end 28 of the cylinder housing 34 flows out through port 9 and hose 19 to port 6 of control valve B, and then flows out port 4 and back to reservoir D, alternatively through hoses 17 and 15. Cylinder shaft 35 by now is fully extended from the cylinder housing 34, the hoist being fully raised, and the dump body emptied of its load.

Still referring to FIG. 1A, although a double acting hoist can be "powered down" using the hydraulic system, some operators may take the power take off ("PTO") out of gear and lower an empty dump body by gravity alone, thus using the hoist as a single acting hoist. Because pump A is not turning, inlet port 3 of control valve B becomes blocked such that the hydraulic oil is unable to enter the valve of port 3. As a result, hydraulic oil cannot be drawn by suction into the head end 28 of the cylinder housing 34 through port 9, which thus allows air to enter the cylinder housing. The presence of air is detrimental to the system, including that the air prevents the dump body from being "locked down," which causes the dump body to rattle and bounce during transit.

Figure 1B:
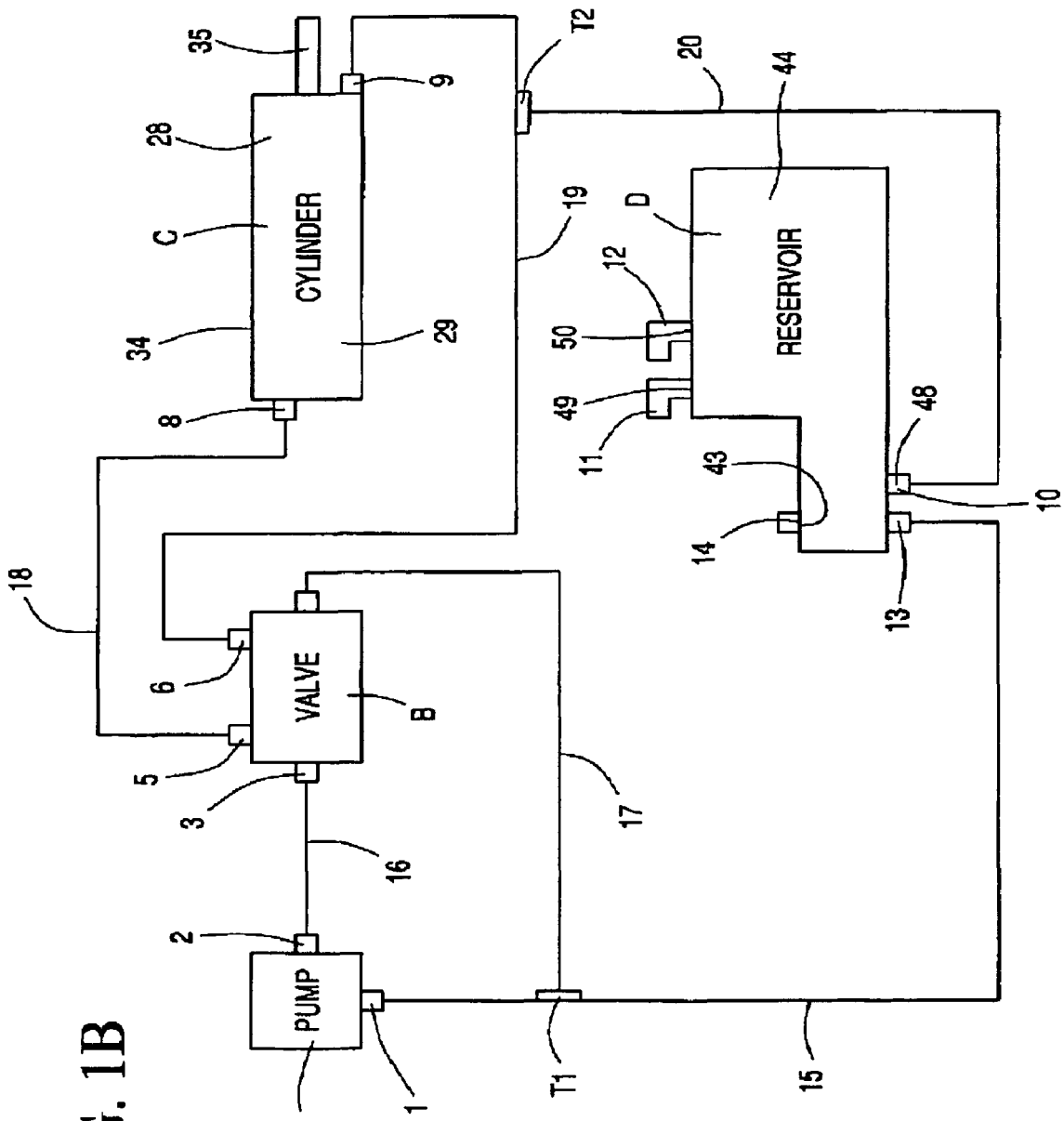
FIG. 1B is a schematic diagram of an embodiment of the hydraulic system of the invention.

FIG. 1B is a schematic of an embodiment of the improved hydraulic system of the invention. Although similar looking to FIG. 1A, FIG. 1B contains a number of novel features not included in the system of FIG. 1A. These features include those identified by reference numbers 10, 11, 12, 20, 48, 49, 50 and T2. As seen in FIG. 1B, the reservoir D also has been modified from that in FIG. 1A, including its shape and the addition of filler opening 43, which can be sealed from air or oil entering or escaping reservoir D, preferably by means of a filler plug or cap 14. The above novel features, and how together they make the improved hydraulic system of the invention, are described herein and shown in FIGS. 2, 3, 4, 5, 6, 7 and 8.

Figure 2A:
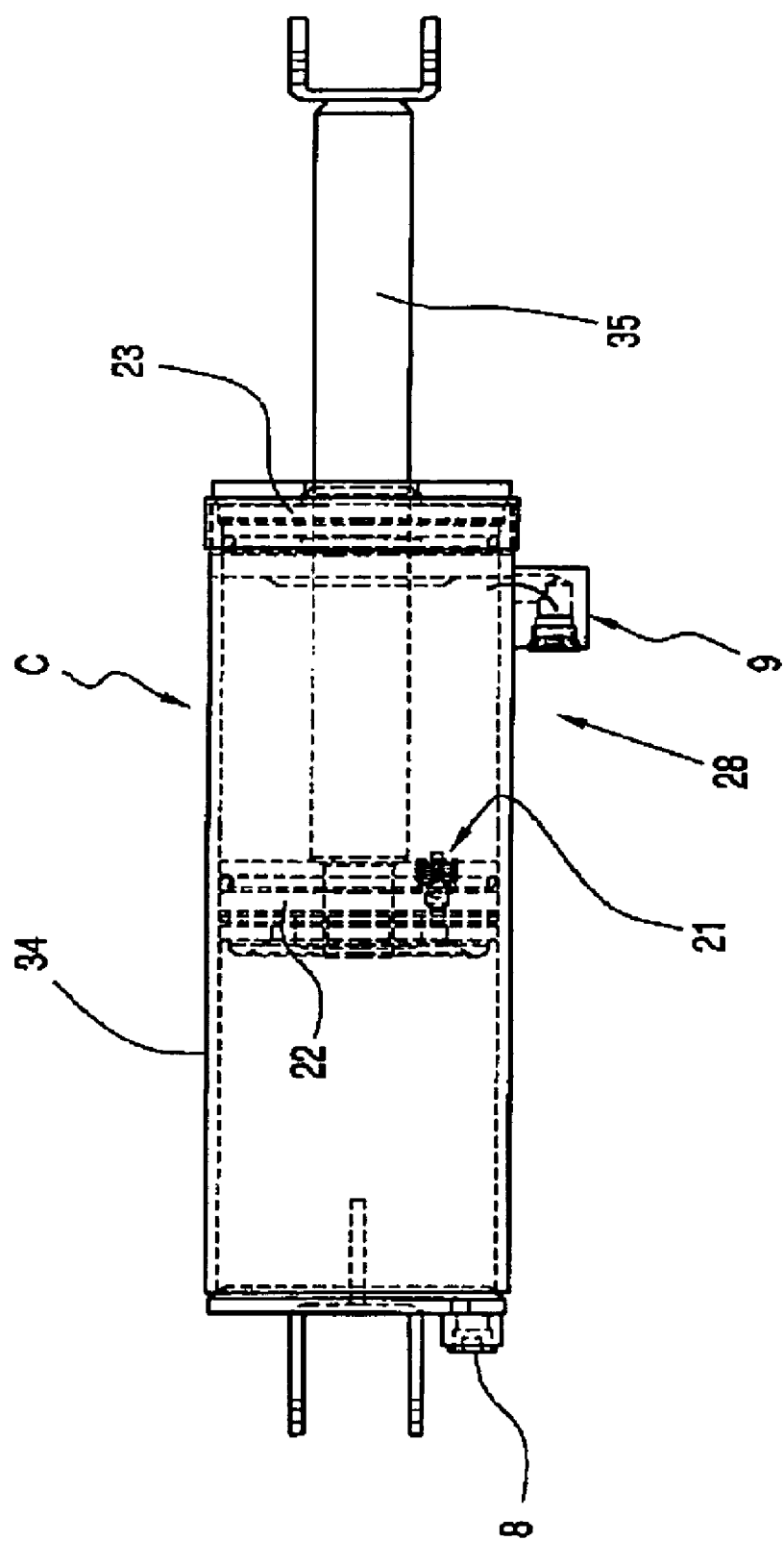
FIGS. 2A and 2B are sectional views of an embodiment of the cylinder C of the hydraulic system of the invention.
Figure 2B:
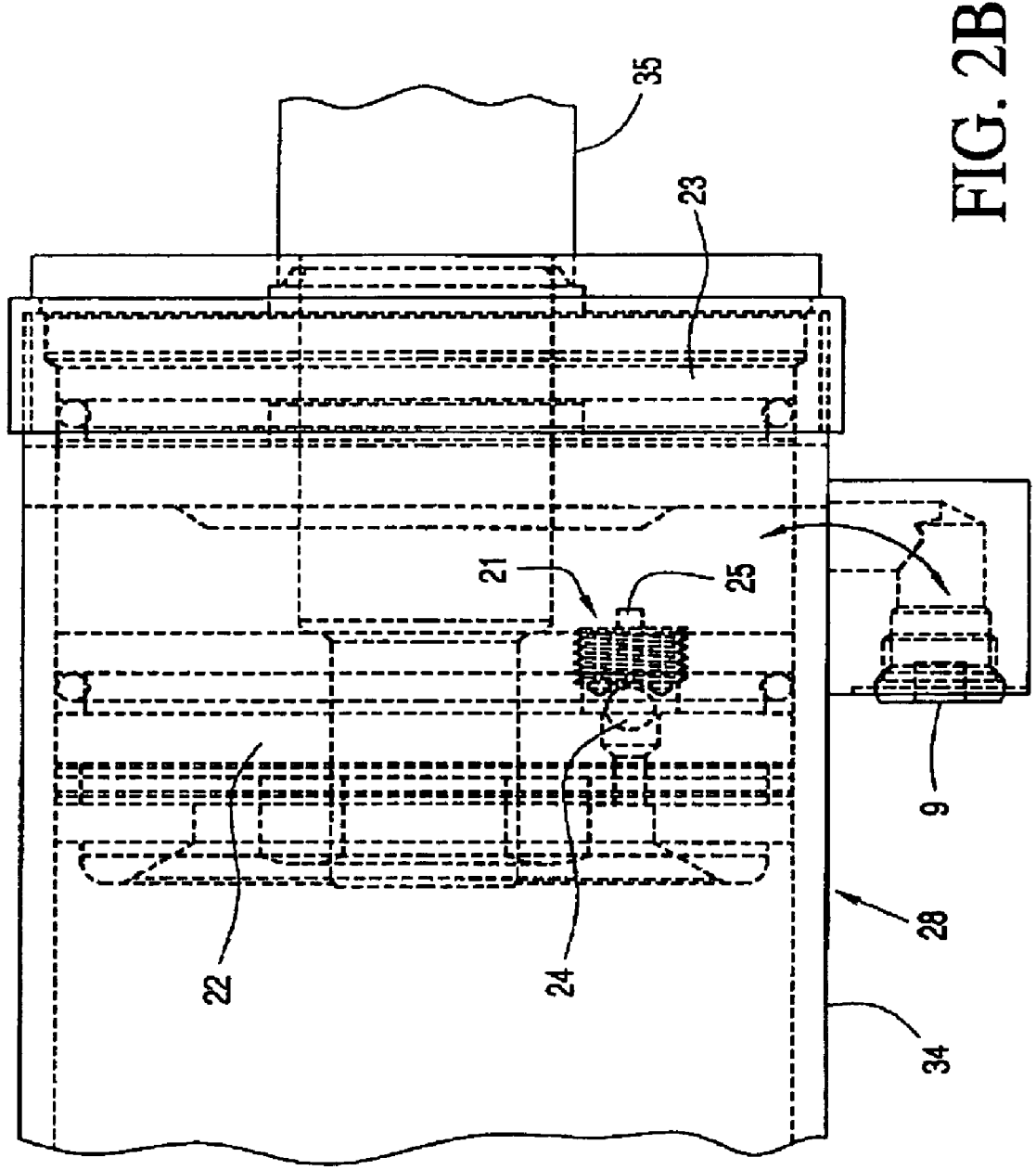
Figure 3:
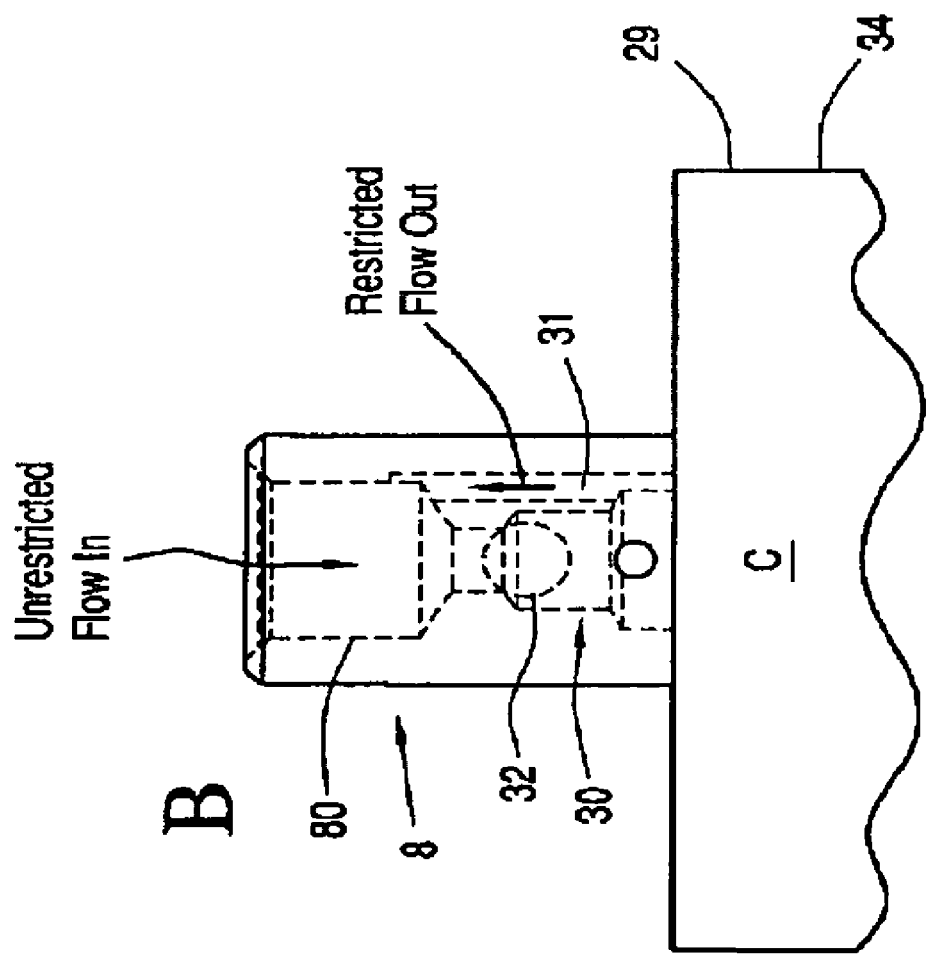
FIGS. 3A and 3B are alternative side views of an embodiment of a valve means for use in the base port of the cylinder C.
Figure 3:
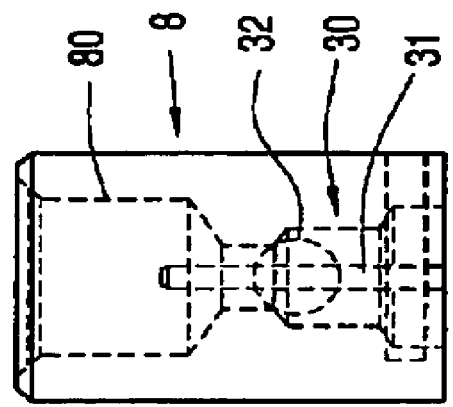
Figure 4:
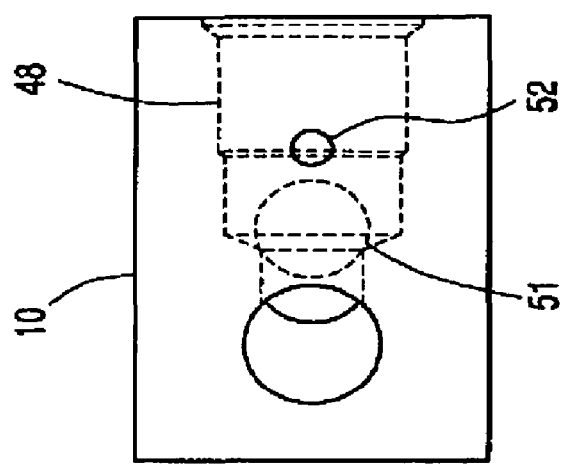
FIGS. 4A, 4B and 4C are alternative views of an embodiment of a valve means for use in the preferred second port of the reservoir D of the invention.
Figure 4:
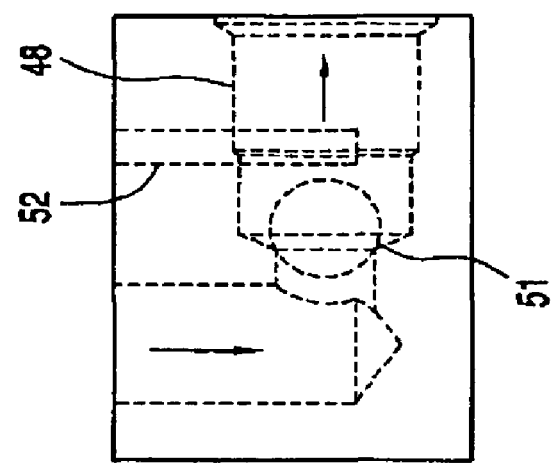
Figure 4:
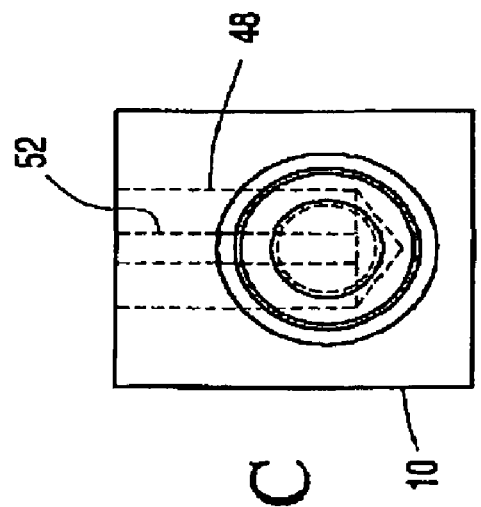

FIGS. 2A and 2B show the internal bypass feature of the invention. FIG. 2A shows the piston 22 and cylinder shaft 35 extended approximately half of its length from the cylinder housing 34. Internal bypass valve 21 is shown as part of piston 22. FIG. 2B is an expanded view of FIG. 2A, and shows piston 22 further extended into the head end 28 of the cylinder housing 34, and near cylinder housing head 23. Ball 24, preferably made of steel, is shown firmly seated inside the internal bypass valve 21 and acts as a check valve, preventing oil from flowing through piston 22.

As piston 22 advances towards the cylinder housing head 23, and reaches full stroke, push-rod 25 contacts cylinder housing head 23, thereby unseating ball 24 inside the internal bypass valve 21. Oil then flows around ball 24, through the internal bypass valve 21, out port 9 and back to reservoir D through control valve B (FIG. 1B). In this embodiment, oil is allowed to return to the reservoir without the system being subjected to full relief valve pressure. In addition, preferably all of the air can be flushed from the system and back to reservoir D each time cylinder C is fully extended. When the operator then adjusts system control valve B to retract the cylinder shaft 35 into cylinder housing 34, thereby lowering the dump body, oil then flows back through port 9 into cylinder housing 34 between piston 22 and cylinder housing head 23, and into the internal bypass valve 21. This reverse flow of oil then causes ball 24 to be seated inside and close the internal bypass valve 21 to prevent any backflow of oil through piston 22. As a result, cylinder shaft 35 retracts into cylinder housing 34.

FIGS. 3A and 3B show a preferred valve 80 for base port 8. The preferred valve, which comprises a combination of check valve 30 and restrictor 31, which restrictor 31 in a preferred embodiment contains a narrow passageway, substantially restricts the flow of hydraulic fluid through the base port 8 from the cylinder housing 34. To raise a hoist associated with the piston 22 and cylinder shaft 35, hydraulic oil under pressure is pumped into the cylinder housing 34 unrestricted through the preferred valve 80 of base port 8. The oil instantly unseats the built-in check valve ball 32 and flows unrestricted into the cylinder housing 34. After unloading the dump body, and the operator adjusts the control valve B to lower the empty body, the check valve ball 32 of the preferred valve 80 once again becomes firmly seated, thereby restricting the return oil flow from the cylinder housing 34 through the narrow passageway in restrictor 31. In this embodiment, if the operator takes the PTO out of gear, the empty dump body descends slowly, thereby allowing time for the system to transport oil automatically to the head end 28 of the cylinder housing 34, while at the same time preventing air from entering the system. If instead the operator leaves the PTO in gear, the dump body will be powered down quickly due to the oil being pumped under pressure, which oil is therefore able to flow through the restrictor 31 at the full capacity of pump A.

The restricted oil passageway of restrictor 31 in preferred valve 80 is also an important safety feature of the subject hydraulic system. For example, it is not uncommon for a loaded dump body at some, sometimes rough, construction sites to become unstable while raising the body, so as to even cause the truck to tip over. The operator typically reacts in such a situation by over-adjusting the control valve B to lower the body quickly. However, if lowered too quickly, the loaded body may slam into the truck frame and cause serious damage or injury. This is particularly true of front mount telescopic truck hoists. In contrast, a fully loaded dump body can be lowered using the subject hydraulic system both quickly and safely without causing damage or injury.

Referring again to FIG. 1B, hose 20 preferably is connected at one end to a Tee T2 in hose 19 between port 6 of control valve B and port 9 of the cylinder housing 34, while the other end of hose 20 is connected to reservoir D at port 10. Port 10 contains a means for restricting the flow of hydraulic fluid, which means is preferably a one-way check valve 48 that permits oil to leave, but not enter, reservoir D.

FIGS. 4A, 4B and 4C show three views of an embodiment of the preferred one-way check valve 48 at port 10. Check valve 48 preferably is welded to the bottom of reservoir D as shown in FIG. 4C and FIGS. 5B and 5C. A ball 51, preferably made of steel, allows oil to leave, while preventing oil from entering, reservoir D. Retaining pin 52 prevents ball 51 from escaping from port 10. The check valve 48 at port 10 of reservoir D and hose 20, in combination with other components of the system, are capable of addressing the problem of operator misuse caused by lowering a loaded dump body without the pump A operating. For instance, in the present invention, a loaded or empty dump body can be lowered safely by gravity alone without the pump A operating because the hydraulic pressure created by the weight of the lowering dump body forces the flow of hydraulic oil, in one embodiment of the invention, through the restricted passageway of the restrictor 31 in valve 80 of base port 8 (FIG. 3), whereupon the pressurized oil flows through hose 18 into port 5 of system control valve B (while held open by the operator), and out port 4 to reservoir D, alternatively through hoses 17 and 15. This flow of hydraulic fluid under pressure in turn will contribute to pressurizing the air chamber 44 of reservoir D up to a maximum pressure of about 75 PSI. At the same time that reservoir D is being pressurized, the head end 28 of the cylinder housing 34 develops a partial vacuum, in response to which the oil under pressure in the reservoir D flows out of the reservoir through port 10, and the one-way check valve 48, then through hose 20 and into hose 19, and to and through port 9 into the head end 28 of the cylinder housing 34 to fill the void created by the above vacuum. Accordingly, in this embodiment of the invention, the problems caused by operator misuse, as mentioned earlier, should be solved, namely that the dump body can be lowered safely by gravity alone.

An important advantage of the subject invention is that the head end 28 of cylinder housing 34 acts as a reservoir in addition to reservoir D. While the only extra reservoir space needed in the system, in theory, corresponds to the space created by the displacement of the cylinder shaft 35 when it enters cylinder housing 34, in reality, the system requires some additional reservoir capacity for normal operations. In most cases, however, reservoir size can be reduced by as much as ten times simply because the head end 28 of the cylinder housing 34 acts as a reservoir. This is advantageous for a number of reasons: less weight, less hydraulic oil needed, and thus less cost. Smaller sized components also require less space in an already crowded area on the truck occupied by fuel tanks, air tanks, brake components, and more.

Figure 5A:
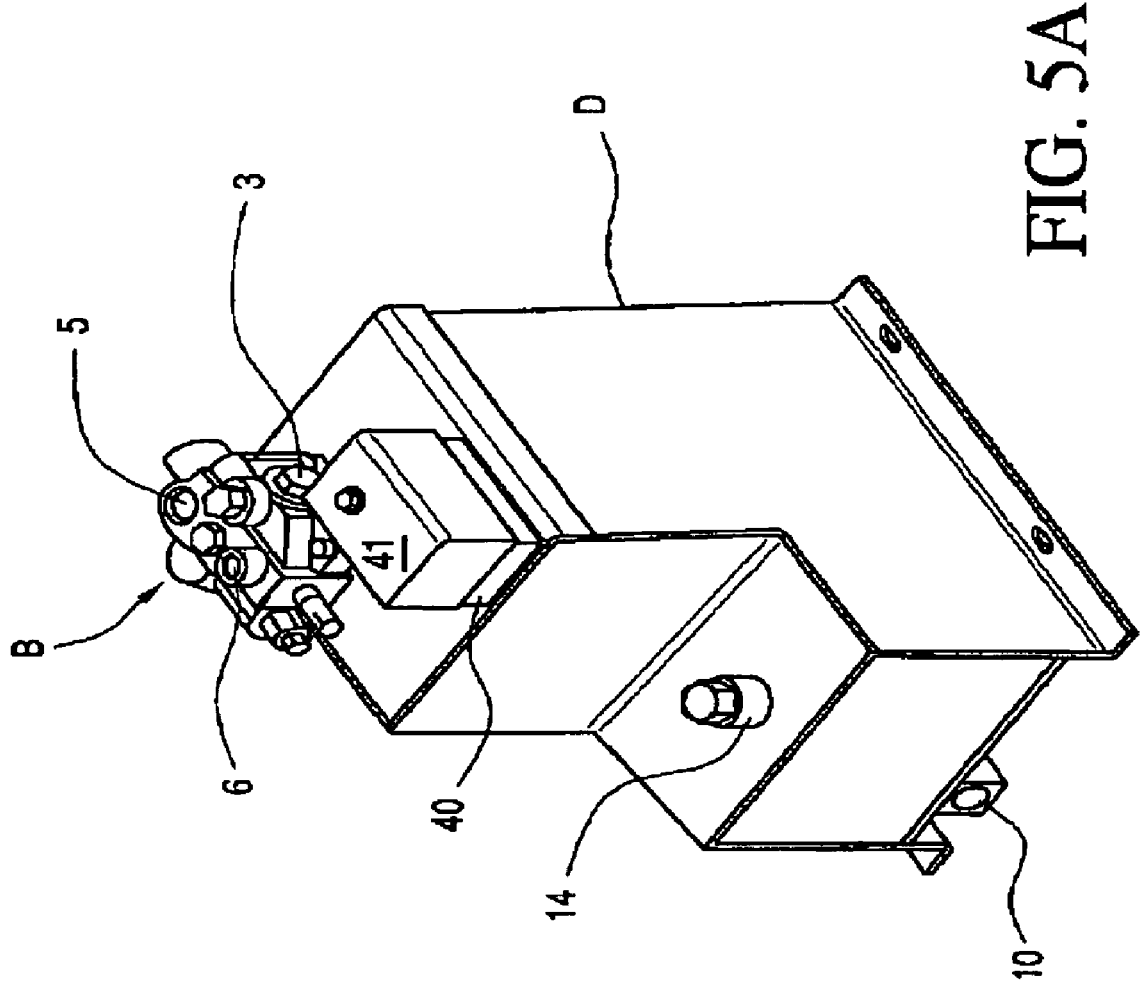
FIG. 5A is a perspective view of an embodiment of the hydraulic system of the invention.
Figure 5C:
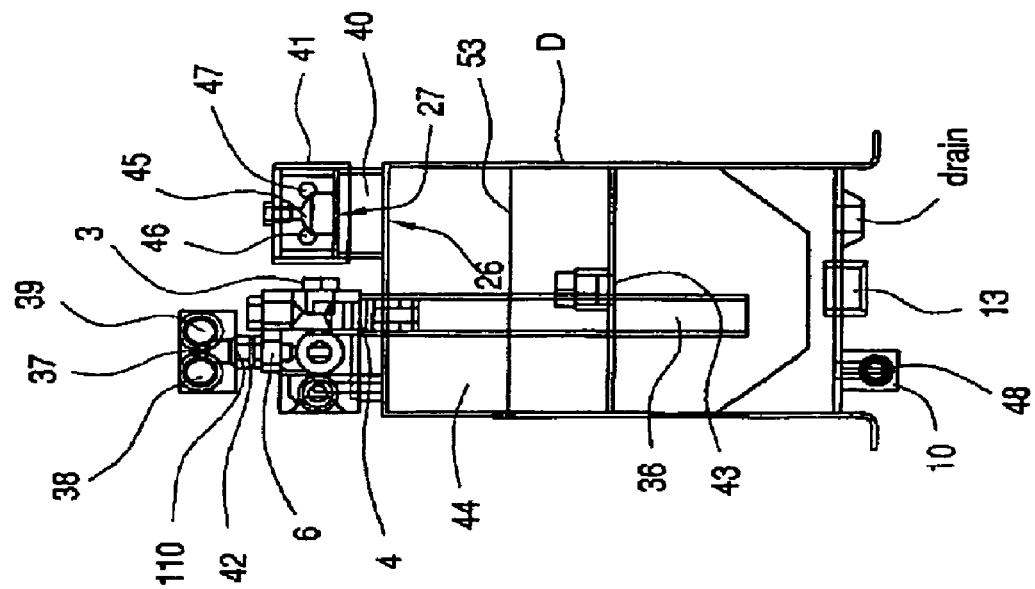
FIGS. 5B and 5C are side elevation views of an embodiment of the subject invention.
Figure 5B:
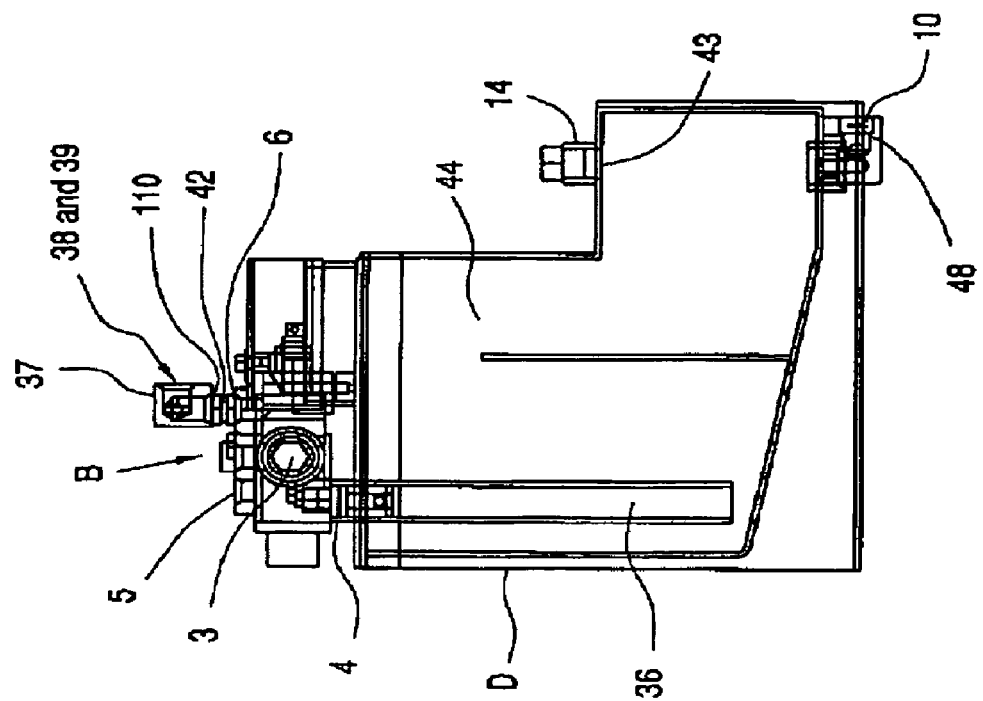
Figure 6:
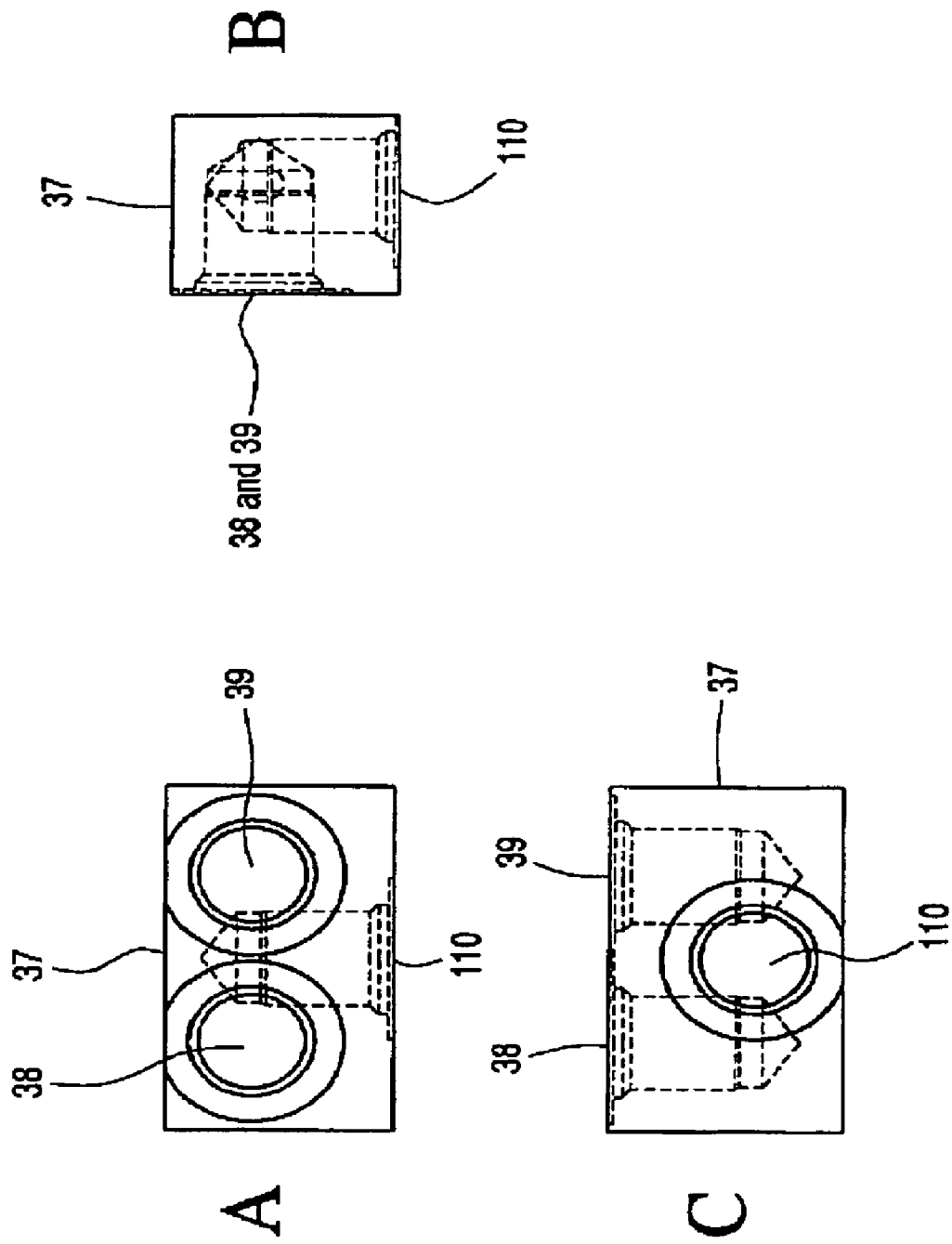
FIGS. 6A, 6B and 6C are alternative side views of an embodiment of a Tee for use in the hydraulic system of the invention.

FIGS. 5A, B and C show preferred embodiments of the reservoir D and the system in accordance with the invention. Preferably, reservoir D can be filled with oil to the level of filler opening or port 43 when the hoist is fully extended, followed by sealing the opening 43 preferably with a filler plug 14. No breather cap is necessary. The amount of oil present in the reservoir D up to the level of the filler opening 43 is, in the embodiment shown in FIGS. 5A, B and C, approximately half the total capacity of reservoir D. The upper portion of the reservoir D is an air chamber 44. A smaller air chamber 40, which is preferably welded atop reservoir D, preferably contains a small hole 26 that allows air into or out of the air chamber 44. On top of air chamber 40 preferably is a similar hole 27 that allows air into or out of a Tee 45 having a pair of tapped holes 46 and 47, which Tee 45 is preferably welded atop air chamber 40. Air controls 11 and 12 (FIG. 8), as shown in FIG. 1B, can be connected to tapped holes 46 and 47.

Holes 26 and 27 are intended to allow air to move into and out of, and between, air chambers 40 and 44, while also preventing oil, which may move around inside reservoir D while the truck is moving, from reaching the tapped holes 46 and 47, and air controls 11 and 12. A cover 41 also can be bolted atop the Tee 45 where the air controls 11 and 12 are connected to the tapped holes 46 and 47, to protect the air controls 11 and 12 from damage, including that caused by the weather.

When the hydraulic system of the invention is first used, such as when installed on a truck or other vehicle, oil can be added continuously to reservoir D through filler opening 43 while the hoist is raised to its full height. When the piston 22 and cylinder shaft 35 reach full stroke, the internal bypass valve 21 allows air and oil to pass through the piston 22 and back to reservoir D. (FIGS. 2A and 2B) Oil can be continuously pumped through cylinder housing 34 and back to reservoir D until at least substantially all of the air present has been expelled from the system. The internal bypass valve 21 will continue to remove any air from the system each time the hoist is raised to its full height.

Figure 8:
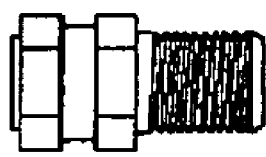
FIGS. 8A and 8B are perspective views of embodiments of a pneumatic relief valve and a check valve, respectively, for regulating air pressure within the reservoir D of the invention.
Figure 8:
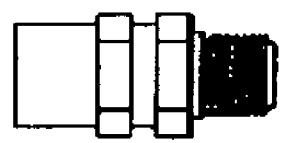

Referring to FIGS. 5A, 5B and 5C, approximately the top half of reservoir D contains air, the amount and pressure of which preferably is controlled by air controls 11 and 12, which are preferably check valve 49 and relief valve 50, respectively (FIG. 8), which can be installed at the top of the reservoir D (as shown in FIG. 1B). The check valve 49 allows air to enter the air chamber 44 of reservoir D whenever at least a slight vacuum exists in the reservoir. The relief valve 50 allows air to leave reservoir D, including if and when the air pressure in the reservoir reaches a maximum of about 75 PSI. Preferred embodiments of the check valve 49 and the relief valve 50 are shown in FIG. 8.

With reservoir D filled with hydraulic oil preferably to the level of filler opening 43 and then sealed preferably while the hoist is fully extended, air present in the air chamber 44 will become pressurized as oil enters reservoir D from cylinder C. The oil in air chamber 44 becomes pressurized because the fully extended cylinder C holds more oil than when fully closed. This is because cylinder shaft 35 occupies a portion of the space within the cylinder housing 34 of the closed cylinder. The difference in volume of oil between the extended cylinder and the closed cylinder is equal to the volume of the cylinder shaft. Now as the hoist is lowered, more oil enters the reservoir from the base end 29 of the cylinder housing 34 than leaves the reservoir to fill the head end 28 of the cylinder housing. Thus, the oil level within reservoir D rises as oil displaces some of the air, which is being compressed into a smaller space. The oil level may rise inside the reservoir to the level of the line 53 shown in FIG. 5C or higher depending on the length and/or diameter of cylinder shaft 35. The combination of the pressurized air within the reservoir plus the suction created by the closing hoist cylinder will keep the head end 28 of the cylinder housing 34 filled with oil whether or not the pump is running.

The present invention is believed to be unique in part because the reservoir D, a preferred embodiment of which is shown in FIG. 1B, is sealed, or substantially sealed, from air flowing into and out of the reservoir, as compared to other hydraulic systems in which air is able to flow freely through a breather cap, or similar device, on the reservoir. Due to the reservoir D being sealed, the air pressure in the air chamber 44 preferably is maintained within a range from about 0 to a maximum of about 75 PSI. Normally, however, the air pressure in air chamber 44 should not exceed about 30 to about 40 PSI.

FIGS. 5A, 5B and 5C show actual depictions of preferred embodiments of the invention, the structural features of which are identified using many of the same reference numbers as in the schematic of FIG. 1B. As shown in FIGS. 5A, 5B and 5C, the inlet port 3 of system control valve B, which is mounted atop reservoir D, can receive oil flow from pump A (FIG. 1B). In FIGS. 5B and 5C, the outlet port 4 is shown at the bottom portion of the control valve B. Also shown in FIGS. 5B and 5C is a metal tube 36 which alternatively can empty the return flow of oil from port 4 directly into the reservoir D. In FIGS. 5A and 5B, port 5 is shown on the top portion of control valve B, which port can be connected by hose 18 to the base port 8 of cylinder housing 34 (FIG. 1B). In FIGS. 5B and 5C, port 6 of control valve B is shown connected to Tee 37 (which corresponds to T2 in FIG. 1B). Oil flows from port 6 into Tee 37, out port 39 of Tee 37 (FIGS. 5B and 5C), and then to port 9 of cylinder housing 34 (FIG. 1B). The other port of Tee 37 shown in FIGS. 5B and 5C, port 38, can be connected by hose 20 (FIG. 1B) to port 10 of reservoir D. The solid line 19 shown in FIG. 1B corresponds in FIG. 5B to a fitting 42 connecting port 6 to port 110 of Tee 37. The flow of oil in the hydraulic system shown in FIGS. 5A, 5B and 5C is the same as shown schematically in FIG. 1B.

FIGS. 6A, 6B and 6C show expanded views of Tee 37, which has been described in the preceding paragraph.

Figure 7:
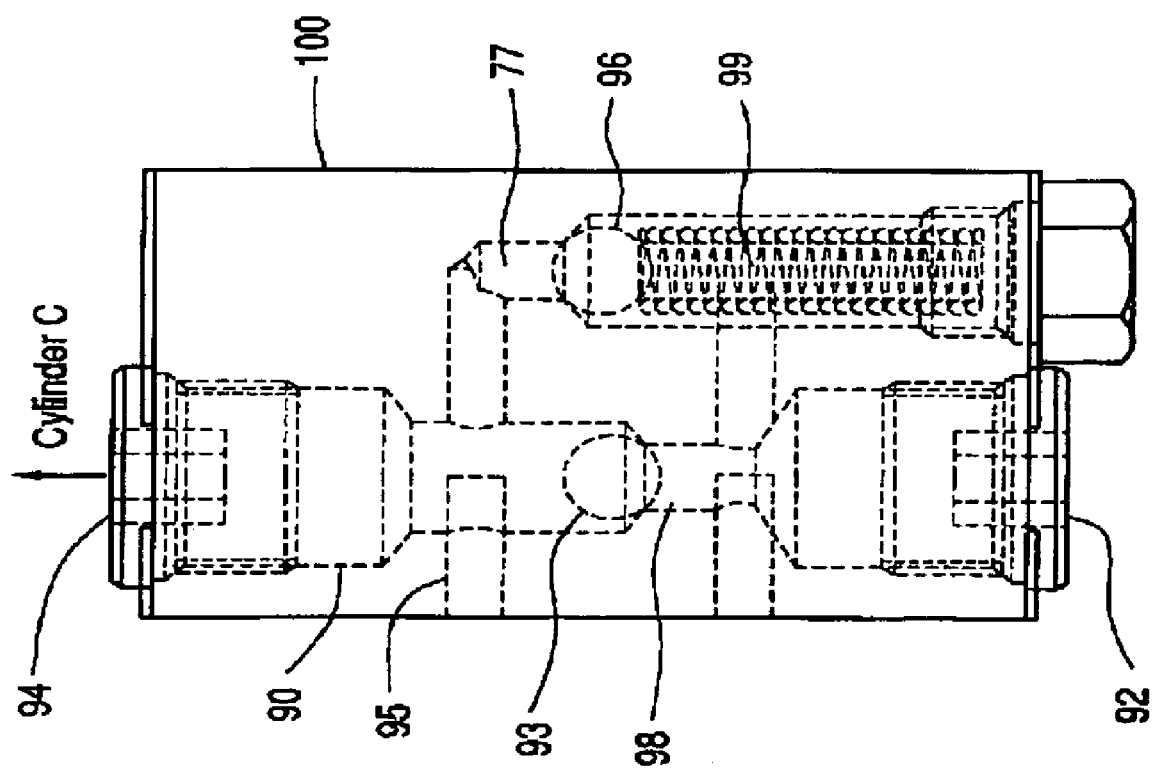
FIG. 7 is a side view of an additional embodiment of a valve means for optional use if installed as a coupling between hoses that supply fluid to the base port of the cylinder C of the invention.

FIG. 7 shows an additional optional embodiment, a valve 90 for use as a coupling 100 between hoses connected at base port 8 of cylinder housing 34 and port 5 of control valve B.

Valve 90 would be useful in an embodiment of the invention where it is desired that an empty dump body not be lowered by gravity alone. In such embodiment, the operator would be required to leave the PTO in gear and use control valve B to power down the empty body.

Referring to the schematic in FIG. 7, when the hydraulic hoist is in operation, hydraulic fluid from pump A enters valve 90 through port 92, unseats ball 93, exits through port 94, and enters cylinder housing 34 through port 8. Ball 93 is trapped by stop 95, and ball 96 remains seated in orifice 97, as the oil flows unrestricted into the cylinder housing 34. Adjustment of the system control valve B holds the dump body in a raised position.

By using valve 90, an empty dump body is prevented from being lowered by gravity alone. Ball 93 is firmly seated in orifice 98, and ball 96 is held seated in orifice 97 by spring 99. A hydraulic pressure of 300 PSI will hold an empty dump body in the raised position, while the spring 99, which has a compression strength of about twenty pounds, is able to withstand a pressure of about 400 PSI in orifice 97.

With valve 90 installed, the operator must leave the PTO in gear and operate the system control valve B to lower the dump body by power down. The 400 PSI of pressure in orifice 97 is overcome immediately and the dump body is then able to descend faster than it would by gravity alone.

It is understood that the designs and concepts disclosed herein may be produced in different sizes or capacities as may be required for proper performance and to achieve desired results. Furthermore, while the invention has been disclosed by reference to the details of preferred embodiments of the invention, it is to be understood that the disclosure is intended in an illustrative rather than a limiting sense, as it is contemplated that modifications will readily occur to those skilled in the art, within the spirit and the scope of the appended claims.

I claim:

1. A hydraulic system useful in combination with a hoist for raising or lowering a truck bed to and from a truck frame, including the option of safely and controllably lowering said truck bed to said truck frame by gravity alone, said hydraulic system utilizing hydraulic fluid during operation, said hydraulic system comprising:

an extendible and retractable cylinder for raising or lowering said truck bed, said cylinder comprising a cylinder shaft having a first end and a second end, said first end comprising a piston which moves inside a cylinder housing as said cylinder is extended and retracted;

said piston comprising a valve means for regulating the flow of said hydraulic fluid utilized by said hydraulic system through said piston;

said cylinder housing comprising a base end and a head end, said base end comprising a base port that allows said hydraulic fluid to flow into and out of said base end of said cylinder housing, said head end comprising a head port that allows said hydraulic fluid to flow into and out of said head end of said cylinder housing;

said base port comprising a valve means so configured to regulate the flow of said hydraulic fluid through said base port;

a reservoir for storing said hydraulic fluid, said reservoir having an inside and an outside, said inside containing during operation of said system a combination of said hydraulic fluid and air which renders said reservoir capable of being pressurized while lowering said truck bed, said reservoir comprising a first port and a second port through which said hydraulic fluid flows during said operation, said second port comprising a valve means that permits said hydraulic fluid to leave, but not enter, said reservoir, said reservoir further comprising a third port through which said hydraulic fluid can be added to said reservoir prior to said operation, said third port including during said operation a means for sealing said third port from said air leaving said reservoir and for sealing said third port from outside air entering said reservoir;

a system control valve means fluidly connected to said reservoir and both said head end and said base end of said cylinder housing for regulating the flow of said hydraulic fluid between said reservoir and said cylinder housing;

a pump for pumping said hydraulic fluid through said system, said pump fluidly connected to said system control valve means and said reservoir;

said reservoir also fluidly connected directly to said head end of said cylinder housing;

wherein said reservoir is so designed such that when pressurized while lowering said truck bed, hydraulic fluid flows from said reservoir and into said head end of said cylinder housing, whereby the combination of said pressurized reservoir and said hydraulic fluid present in said head end of said cylinder housing permits the option of said truck bed being safely and controllably lowered by gravity alone to said truck frame.

2. The hydraulic system of claim 1, wherein said cylinder is a double acting cylinder.

3. The hydraulic system of claim 1, wherein said truck bed is a dump body of a dump truck.

4. The hydraulic system of claim 1, wherein said valve means in said base port is capable of substantially restricting, and thereby pressurizing, the flow of said hydraulic fluid from said base end of said cylinder housing while lowering said truck bed by gravity alone.

5. The hydraulic system of claim 1, wherein said system further comprises an additional optional valve means which is so designed such that when installed in a hydraulic line connected to said base port is capable of blocking the flow of said hydraulic fluid from said cylinder housing while attempting to lower said truck bed by gravity alone.

6. The hydraulic system of claim 1, wherein said means for sealing said third port is a plug.

7. The hydraulic system of claim 1, wherein said reservoir holds no more than about three to about five gallons of said hydraulic fluid.

8. The hydraulic system of claim 1, wherein said reservoir is capable of being pressurized up to about 75 PSI.

9. The hydraulic system of claim 1, wherein said reservoir is fluidly connected to said head end of said cylinder housing by hosing.

10. The hydraulic system of claim 1, wherein said reservoir is shaped in part like a set of steps comprising a lower step and an upper step, each said step comprising a front portion and a top portion.

11. The hydraulic system of claim 10, wherein said upper step of said reservoir comprises an air chamber.

12. The hydraulic system of claim 11, wherein said third port is located on said top portion of said lower step.

13. A method for safely and controllably lowering a truck bed to a truck frame by gravity alone, after raising said truck bed, comprising the following steps:

a) raising said truck bed from said truck frame with a hoist in combination with a hydraulic system which utilizes hydraulic fluid during operation, said hydraulic system comprising:

an extendible and retractable cylinder for raising or lowering said truck bed, said cylinder comprising a cylinder shaft having a first end and a second end, said first end comprising a piston which moves inside a cylinder housing as said cylinder is extended and retracted;

said piston comprising a valve means for regulating the flow of said hydraulic fluid utilized by said hydraulic system through said piston;

said cylinder housing comprising a base end and a head end, said base end comprising a base port that allows said hydraulic fluid to flow into and out of said base end of said cylinder housing, said head end comprising a head port that allows said hydraulic fluid to flow into and out of said head end of said cylinder housing;

said base port comprising a valve means so configured to regulate the flow of said hydraulic fluid through said base port, said valve means capable of substantially restricting, and thereby pressurizing, the flow of said hydraulic fluid out of said base end of said cylinder housing while lowering said truck bed by gravity alone;

a reservoir for storing said hydraulic fluid, said reservoir having an inside and an outside, said inside containing during operation of said system a combination of said hydraulic fluid and air which renders said reservoir capable of being pressurized while lowering said truck bed, said reservoir comprising a first port and a second port through which said hydraulic fluid flows during said operation, said second port comprising a valve means that permits said hydraulic fluid to leave, but not enter, said reservoir, said reservoir further comprising a third port through which said hydraulic fluid can be added to said reservoir prior to said operation, said third port including during said operation a means for sealing said third port from said air leaving said reservoir and for sealing said third port from outside air entering said reservoir;

a system control valve means fluidly connected to said reservoir and both said head end and said base end of said cylinder housing for regulating the flow of said hydraulic fluid between said reservoir and said cylinder housing;

a pump for pumping said hydraulic fluid through said system, said pump fluidly connected to said system control valve means and said reservoir;

said reservoir also fluidly connected directly to said head end of said cylinder housing;

wherein said reservoir is so designed such that when pressurized while lowering said truck bed by gravity alone, hydraulic fluid flows from said reservoir and into said head end of said cylinder housing, whereby the combination of said pressurized reservoir and said hydraulic fluid present in said head end of said cylinder housing permits said truck bed to be safely and controllably lowered by gravity alone to said truck frame; and b) lowering said truck bed to said truck frame by gravity alone.

14. The method of claim 13, wherein said cylinder is a double acting cylinder.

15. The method of claim 13, wherein said reservoir is shaped in part like a set of steps comprising a lower step and an upper step, each said step comprising a front portion and a top portion.

16. The method of claim 15, wherein said third port is located on said top portion of said lower step.

17. The method of claim 16, further comprising the step of adding, prior to said operation of said system, said hydraulic fluid to said reservoir through and to the level of said third port while said cylinder is fully extended, followed by sealing said third port from air entering or leaving said reservoir.

18. The method of claim 17, wherein said third port is sealed with a plug.

19. The method of claim 13, wherein said truck bed is a dump body of a dump truck.

* * * * *